(12) United States Patent
Kim et al.

(10) Patent No.: US 11,498,404 B2
(45) Date of Patent: Nov. 15, 2022

(54) BATTERY STORAGE DEVICE FOR ELECTRIC VEHICLE

(71) Applicants: HYUNDAI MOTOR COMPANY, Seoul (KR); KIA MOTORS CORPORATION, Seoul (KR)

(72) Inventors: Jin Won Kim, Pyeongtaek-si (KR); Byung Su Kim, Incheon (KR); Jun Seok Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 238 days.

(21) Appl. No.: 16/893,817

(22) Filed: Jun. 5, 2020

(65) Prior Publication Data

US 2021/0178882 A1 Jun. 17, 2021

(30) Foreign Application Priority Data

Dec. 12, 2019 (KR) .......................... 10-2019-0166032

(51) Int. Cl.
*B60R 16/04* (2006.01)
*B60K 1/04* (2019.01)
(Continued)

(52) U.S. Cl.
CPC ................ *B60K 1/04* (2013.01); *B60L 58/33* (2019.02); *H01M 10/613* (2015.04);
(Continued)

(58) Field of Classification Search
CPC .............. B60K 1/04; B60K 2001/0438; B60K 2001/005; B60K 2001/0433; B60K 2001/003; B60K 2001/0416; B60K 11/06; B60K 11/00; B60K 1/00; B60R 13/0846; B60R 13/08; B60L 58/33; B60L 58/10; B60L 58/24; B60L 58/26; B60L 50/64; B60L 50/66; B60L 50/00; B60L 50/60; B60L 50/50; B60L 2270/142; B60L 2270/14; H01M 10/613; H01M 10/625; H01M 10/6563; H01M 10/6562;
(Continued)

(56) References Cited

U.S. PATENT DOCUMENTS 6,662,891 B2 * 12/2003 Misu ..................... B60W 10/30
  903/952
7,688,582 B2 * 3/2010 Fukazu ............. H01M 10/6566
  180/68.5

(Continued)

FOREIGN PATENT DOCUMENTS

KR 10-2012-0094697 A 8/2012

*Primary Examiner* — James M Dolak
(74) *Attorney, Agent, or Firm* — Morgan, Lewis & Bockius LLP

(57) ABSTRACT

A battery case of a battery storage device is disposed on a vehicle floor, thereby securing an interior space. A battery module of the battery storage device can be cooled by using an interior air, thereby simplifying a cooling structure and saving a manufacturing cost. In addition, the battery storage device for an electric vehicle blocks noise generated by a cooling device and an electrical component from flowing into the interior, thereby preventing the occurrence of a passenger's discomfort feeling caused by the noise.

12 Claims, 9 Drawing Sheets

(51) Int. Cl.
    *B60L 58/33*     (2019.01)
    *H01M 10/613*     (2014.01)
    *H01M 10/6563*     (2014.01)
    *H01M 10/625*     (2014.01)
    *B60R 13/08*     (2006.01)

(52) U.S. Cl.
    CPC ..... *H01M 10/625* (2015.04); *H01M 10/6563* (2015.04); *B60K 2001/0438* (2013.01); *B60R 13/0846* (2013.01); *H01M 2220/20* (2013.01)

(58) Field of Classification Search
    CPC .. H01M 10/6556; H01M 10/60; H01M 10/61; H01M 2220/20; H01M 50/204; H01M 50/20
    See application file for complete search history.

(56) References Cited

U.S. PATENT DOCUMENTS

| | | | | |
|---|---|---|---|---|
| 7,963,831 B2* | 6/2011 | He | ................ | B60H 1/00278 454/142 |
| 8,186,468 B2* | 5/2012 | Parrett | ................ | B60L 1/003 903/952 |
| 8,684,118 B2* | 4/2014 | Kosaka | ................ | B60L 50/16 180/68.5 |
| 8,717,761 B2* | 5/2014 | Aoki | ................ | B60K 1/04 180/68.5 |
| 8,820,455 B2* | 9/2014 | Nitawaki | ................ | B60L 58/26 180/68.5 |
| 8,820,815 B2* | 9/2014 | Krenz | ................ | H01M 10/6556 296/65.01 |
| 9,048,517 B2* | 6/2015 | Lim | ................ | H01M 10/625 |
| 9,054,398 B2* | 6/2015 | Ohkuma | ................ | G05D 23/1932 |
| 9,281,546 B2* | 3/2016 | Chung | ................ | H01M 50/209 |
| 9,343,785 B2* | 5/2016 | Bito | ................ | H01M 10/6562 |
| 10,170,806 B2* | 1/2019 | Choi | ................ | H01M 10/6556 |
| 10,272,796 B2* | 4/2019 | Kouno | ................ | H01M 10/625 |
| 10,399,455 B2* | 9/2019 | Sugitate | ................ | B60L 58/00 |
| 10,434,897 B2* | 10/2019 | Sugitate | ................ | H01M 10/663 |
| 10,971,773 B2* | 4/2021 | Kim | ................ | H01M 10/613 |
| 11,230,177 B2* | 1/2022 | Kim | ................ | B60K 11/06 |
| 11,251,495 B2* | 2/2022 | Hase | ................ | H01M 10/486 |
| 11,283,121 B1* | 3/2022 | Boecker | ................ | H01M 50/30 |
| 11,312,205 B2* | 4/2022 | Aoki | ................ | B60H 1/246 |
| 11,342,597 B2* | 5/2022 | Roh | ................ | H01M 10/482 |
| 2004/0261377 A1* | 12/2004 | Sung | ................ | H01M 10/6566 55/385.3 |

\* cited by examiner

BATTERY STORAGE DEVICE FOR ELECTRIC VEHICLE

CROSS REFERENCE TO RELATED APPLICATION

The present application claims priority of Korean Patent Application No. 10-2019-0166032 filed on Dec. 12, 2019, the entire contents of which is incorporated herein for all purposes by this reference.

TECHNICAL FIELD

The present disclosure relates to a battery storage device for an electric vehicle having a battery pack embedded therein and provided with a cooling device configured to cool the battery pack.

BACKGROUND OF THE DISCLOSURE

Recently, interest in eco-friendly vehicles has increased due to causes such as an environmental problem and a high oil price, and an electric vehicle (EV) for allowing a vehicle to run by using electrical energy has been variously developed.

Such an electric vehicle includes a battery powered EV, a fuel cell EV using a fuel cell as an electric motor, a hybrid EV using the electric motor and an engine together, and the like.

In particular, the electric vehicle is provided with a battery module configured to store electrical energy, and the battery module accommodates a plurality of battery cell units in a battery case. Since such a battery case is large in volume and weight, it is important to secure a mounting space in a vehicle body in order to mount the battery case to the vehicle body. In addition, it is required to cool the battery module as high temperature heat is generated when the battery module is driven, but the optimal design of the battery case considering the mounting space of the vehicle body and the cooling of the battery module has not been performed.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

The present disclosure is intended to solve the above problem, and an object of the present disclosure is to provide a battery storage device for an electric vehicle, which prepares a battery case in a vehicle floor, thereby securing an interior space, and cools a battery pack by using interior air, thereby simplifying a cooling structure and saving a manufacturing cost.

A battery storage device for an electric vehicle according to the present disclosure for achieving the object includes a battery case accommodating a battery pack in an internal space of the battery case, the battery case including an air suction port through which an interior air is sucked and an air discharge port to which the air having cooled the battery pack is discharged, and including a cooling device connected to the air discharge port to circulate the interior air to the internal space; and a battery cover covering the battery case, having an inflow hole matched with the air suction port when mounted to the battery case, and provided with a first part noise reduction member disposed between the cooling device and the inflow hole to block the driving sound generated when the cooling device is driven from flowing into the interior through the inflow hole.

As the battery case is disposed below a back seat of the vehicle and extends in a transverse direction of the vehicle, the internal space including the battery pack extends in the transverse direction of the vehicle.

The air discharge port connected to the cooling device is disposed at one side of a lower side of the battery case, and the air suction port is disposed at another side of an upper side of the battery case to be spaced apart from the air discharge port.

The internal space of the battery case has a lower flow path connected to the air discharge port below the battery pack and an upper flow path connected to the air suction port above the battery pack around the battery pack, and the upper flow path is formed to be inclined upward from one side to another side facing the air suction port.

A gap space is disposed between an upper end of the battery case and the battery cover, and a first noise reduction member is interposed in the gap space between the upper end of the battery case and the battery cover.

The first noise reduction member is bent to cover the front end of the battery case facing the front of the vehicle at an upper end of the battery case.

The air suction port includes plural portions, the plural portions having areas being different from each other and increasing in a direction away from the air discharge port provided with the cooling device.

The battery case is provided with a suction duct connected to be communicated with the air suction port and extending to the interior to guide the interior air to the internal space.

The suction duct is disposed at a center of the vehicle in a transverse direction on a vehicle floor on which the battery case is disposed, and a suction port through which the interior air is introduced faces the front of the vehicle.

The suction port includes a grill part having a plurality of holes by a plurality of ribs crossing vertically and laterally.

The battery case further includes an electrical component, and the electrical component is disposed to be partitioned from the internal space in which the battery pack is accommodated, and the battery cover covers the battery case including the internal space and the electrical component, and includes a second noise reduction member for an electrical component to cover the electrical component to block a noise generated by the electrical component from flowing into the interior.

The second noise reduction member for the electrical component is bent to cover a front end of the battery case facing the front of the vehicle at an upper end of the electrical component.

The battery storage device for the electric vehicle composed of the structure as described above prepares the case on the vehicle floor, thereby securing the interior space, and cools the battery module by using the interior air, thereby simplifying the cooling structure and saving the manufacturing cost. In addition, noises generated by the cooling device and the electrical component are blocked from flowing into the interior, thereby preventing the occurrence of the passenger's discomfort feeling caused by generating the noises.

BRIEF DESCRIPTION OF THE DRAWINGS

The above and other objects, features and other advantages of the present disclosure will be more clearly under

DETAILED DESCRIPTION OF THE DISCLOSURE

Hereinafter, a battery storage device for an electric vehicle according to a preferred embodiment of the present disclosure will be described with reference to the accompanying drawings.

Figure 1:
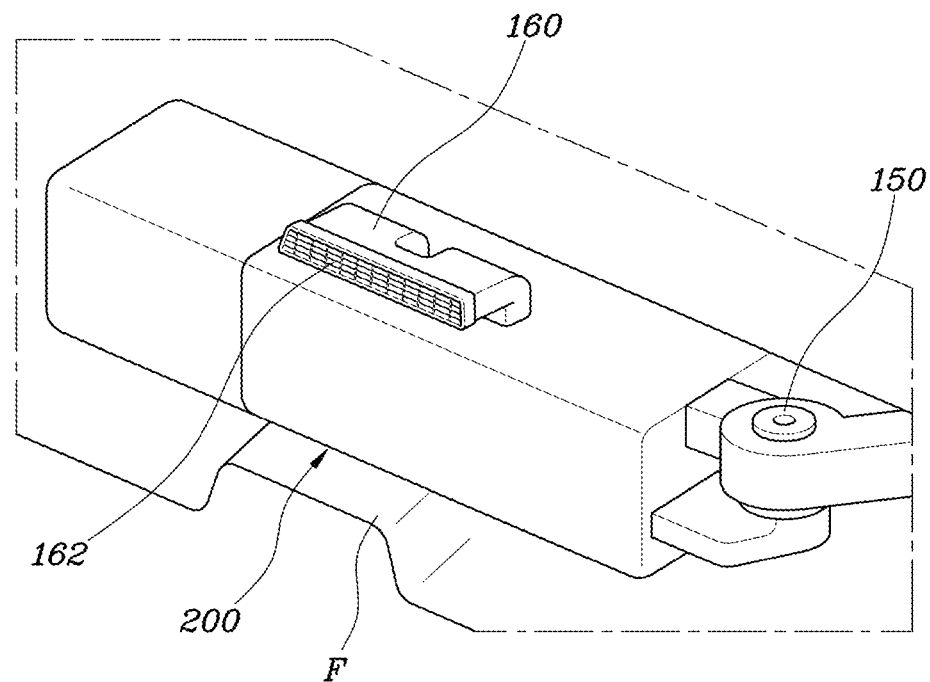
- FIG. 1 is a diagram showing a battery storage device for an electric vehicle according to the present disclosure.

FIG. 1 is a diagram showing a battery storage device for an electric vehicle according to the present disclosure, and FIGS. 2 to 9 are diagrams for explaining the battery storage device for the electric vehicle shown in FIG. 1.

Figure 2:
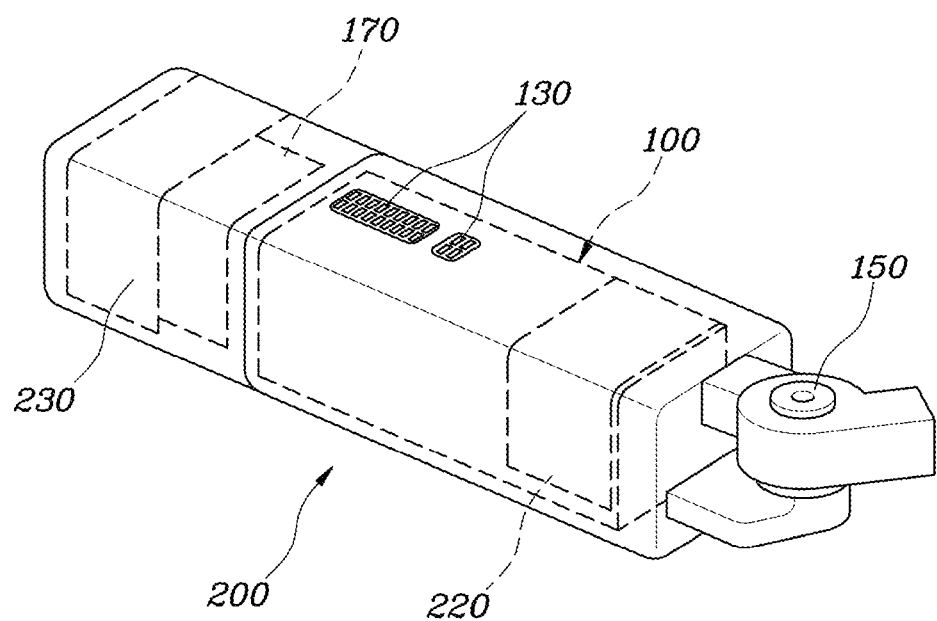
FIGS. 2 to 9 are diagrams for explaining the battery storage device for the electric vehicle shown in FIG. 1.
Figure 3:
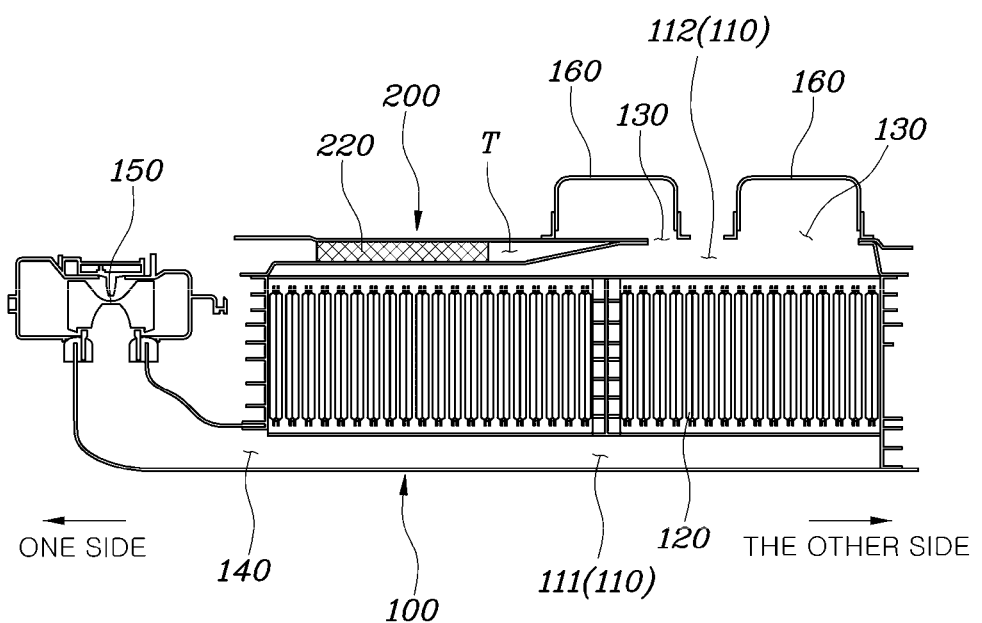

As shown in FIGS. 1 to 3, a battery storage device for an electric vehicle according to the present disclosure includes a battery case 100 configured to be installed to a vehicle floor (F), accommodating a battery pack 120 in an internal space 110 provided by the battery case 100, formed with an air suction port 130 through which an interior air is sucked and an air discharge port 140 to which the air having cooled the battery pack 120 is discharged, and provided with a cooling device 150 connected to the air discharge port 140 to circulate the interior air to the internal space 110; and a battery cover 200 formed to cover the battery case 100, having an inflow hole 210 matched with the air suction port 130 when mounted to the battery case 100, and provided with a first noise reduction member 220 provided between the cooling device 150 and the inflow hole 210 to block the driving sound generated when the cooling device 150 is driven from flowing into the interior through the inflow hole 210.

As described above, the battery pack 120 is embedded in the battery case 100, and the air suction port 130 and the air discharge port 140 for circulating the cooling air to the battery pack 120 are formed therein. Here, the air suction port 130 communicates the air in the vehicle interior, and the air discharge port 140 is connected to the cooling device 150, such that the interior air is introduced through the air suction port 130 when the cooling device 150 is driven to cool the battery pack 120, and the air having cooled the battery pack 120 is discharged through the air discharge port 140. As described above, in the present disclosure, when the cooling device 150 is driven, the interior air can be communicated to the internal space 110 of the battery case 100, thereby cooling the battery pack 120 in an air-cooled manner.

Such a battery case 100 is covered and protected by the battery cover 200, and the battery cover 200 is formed with an inflow hole 210 matched with the air suction port 130 when mounted to the battery case 100. The battery cover 200 can be made of a steel material to be able to protect the battery case 100. In particular, the battery cover 200 is provided with a first noise reduction member 220 provided between the cooling device 150 and the inflow hole 210 to block the driving sound generated when the cooling device 150 is driven from flowing into the interior through the inflow hole 210. Such a noise reduction member 220 can be made of a rubber material which is a material capable of absorbing sound.

As described above, when the battery cover 200 is mounted to the battery case 100, the first noise reduction member 220 blocks the driving sound of the cooling device 150 from flowing into the interior through the inflow hole 210 and the air suction port 130 between the cooling device 150 and the inflow hole 210, thereby eliminating the passenger's dissatisfaction feeling which can occur as a noise generated by driving the cooling device 150 and a noise generated by the components including the battery pack 120 flow into the interior.

Specifically describing the above-described present disclosure, as the battery case 100 according to the present disclosure is disposed below a back seat and is disposed to extend in the transverse direction of the vehicle (e.g., a direction from the front of the vehicle to the back of the vehicle), the internal space 110 including the battery pack 120 can extend in the transverse direction of the vehicle.

As described above, as the battery case 100 is disposed at the upper side of the vehicle floor (F) below the back seat, components for separate watertightness are unnecessary. In addition, as the battery case 100 is disposed to extend in the transverse direction of the vehicle, the weight of the battery case 100 is distributed in the transverse direction of the vehicle.

Meanwhile, as shown in FIG. 3, one side of the bottom of the battery case 100 can be formed with the air discharge port 140 connected to the cooling device 150, and the other side of the top of the battery case 100 can be formed with the air suction port 130 spaced apart from the air discharge port 140.

As a result, as the internal space 110 of the battery case 100 is formed with a circulation path of the air in which the interior air introduced through the air suction port 130 from the top is communicated to the air discharge port 140 of the bottom through the battery pack 120, the cooling of the battery pack 120 can be performed.

That is, since the battery case 100 is installed to the floor (F) and cools the battery pack 120 by using the interior air, the air suction port 130 can be formed at the top of the internal space 110, thereby shortening the inflow path of the interior air. In addition, the air discharge port 140 can be formed at the bottom of the internal space 110, such that the circulation path of the air where the interior air introduced from the top of the internal space 110 passes through the battery pack 120 is formed.

In addition, the air discharge port 140 is formed at one side of the bottom of the battery case 100, and the air suction port 130 is formed at the other side of the top thereof, such that the air flowing into the internal space 110 through the air suction port 130 as shown in FIG. 3 is discharged through the air discharge port 140 after circulating throughout the battery pack 120.

Meanwhile, the internal space 110 of the battery case 100 has a lower flow path 111 connected to the air discharge port 140 below the battery pack 120 and an upper flow path 112 connected to the air suction port above the battery pack 120 around the battery pack 120, and the upper flow path 112 can be formed to be inclined upward from one side to the other side facing the air suction port 130.

As described above, the internal space 110 has the lower flow path 111 and the upper flow path 112, respectively, below and above the battery pack 120, such that the air flowing into the internal space 110 through the air suction port 130 is moved along the upper flow path 112 to form a path through which the air can be communicated throughout the battery pack 120, and the air moved to the lower flow path 111 through the battery pack 120 can be discharged to the outside through the air discharge port 140.

In particular, the upper flow path 112 is formed to be inclined upward from one side to the other side facing the air suction port 130. That is, in the present disclosure, as the air discharge port 140 is formed at one side of the bottom of the internal space 110 and the air suction port 130 is formed at the other side of the top of the internal space 110, the closer to the air discharge port 140 side to which the cooling device 150 is connected, the greater the amount of communicating the air. Accordingly, the upper flow path 112 is formed to be inclined upward from one side where the air discharge port 140 is located to the other side, such that as the amount of communicating the air increases at the other side of the battery pack 120 and the amount of communicating the air decreases at one side of the battery pack 120, the air introduced through the air suction port 130 located at the other side can pass through the battery pack 120 as a whole to be discharged through the air discharge port 140 located at one side.

Meanwhile, as the battery case 100 has the upper flow path 112 of the internal space 110 formed to be inclined upward from one side to the other side facing the air suction port 130, a gap space (T) can be formed between the upper end of the battery case 100 and the battery cover 200 to flow the driving sound of the cooling device 150 disposed at one side of the battery case 100 into the corresponding gap space.

That is, the driving sound generated by driving the cooling device 150 can flow into the internal space 110 through the air discharge port 140 but can be blocked from flowing into the interior by the battery pack 120, but as the upper flow path 112 is formed to be inclined upward in order to improve the cooling efficiency of the battery case 200, the gap space between the upper end of the battery case 100 and the battery cover 200 is formed when the battery cover 200 is coupled to the upper end of the battery case 100. Since such a gap space acts as a passage where the driving sound of the cooling device 150 can flow into the interior through the air suction port 130, the first noise reduction member 220 can be interposed in the gap space between the upper end of the battery case 100 and the battery cover 200, thereby blocking the driving sound of the cooling device 150 from flowing into the interior.

As a result, the battery case 100 secures the cooling efficiency of the battery pack 120, and blocks the driving sound generated by the cooling device 150 and the noise generated by the components including the battery pack 120 from flowing into the interior by the first noise reduction member 220, thereby eliminating dissatisfaction feeling caused by generating the interior noise.

Such a first noise reduction member 220 can be formed to be bent to cover the front end of the battery case 100 facing the front of the vehicle at the upper end of the battery case 100.

Figure 4:
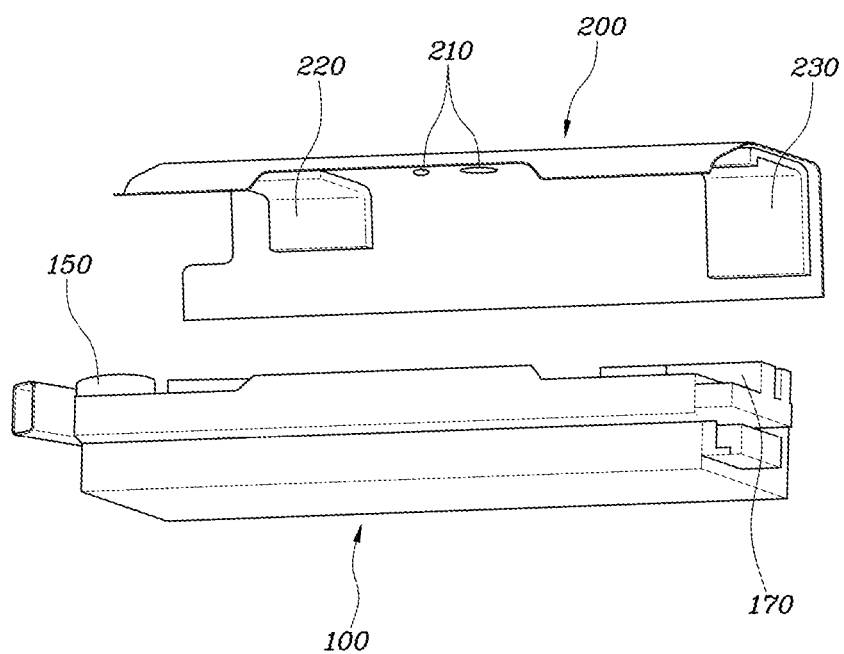

As shown in FIG. 4, the first noise reduction member 220 is formed to be bent from the upper end to the front end of the battery case 100 so that the driving sound generated by the cooling device 150 does not flow into the interior. That is, as the battery case 100 of the present disclosure is disposed in the transverse direction of the vehicle and is disposed below the back seat, an interior passenger easily recognizes the driving sound of the cooling device 150 when the driving sound generated by the cooling device 150 is delivered to the front of the vehicle. Accordingly, the first noise reduction member 220 is formed to be bent to cover the front end together with the upper end of the battery case 100, such that the driving sound of the cooling device 150 is efficiently blocked from flowing into the interior. Of course, the first noise reduction member 220 can be formed to completely surround the battery case 100; as an alternative, since the manufacturing cost is increased as the first noise reduction member 220 is extended to an unnecessary section, the first noise reduction member 220 is formed to cover the upper end and the front end of the battery case 100 so that the driving sound of the cooling device 150 is efficiently blocked.

Figure 5:
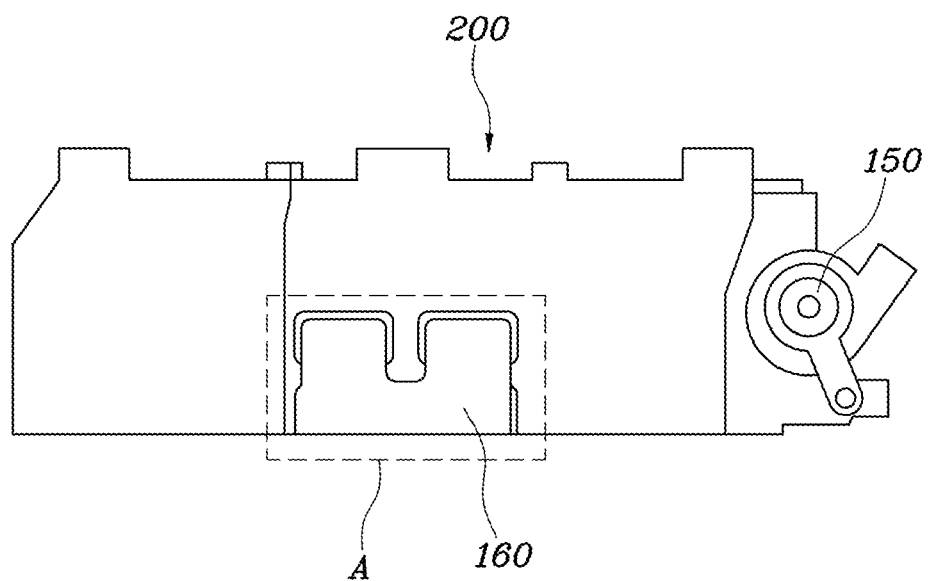
Figure 6:
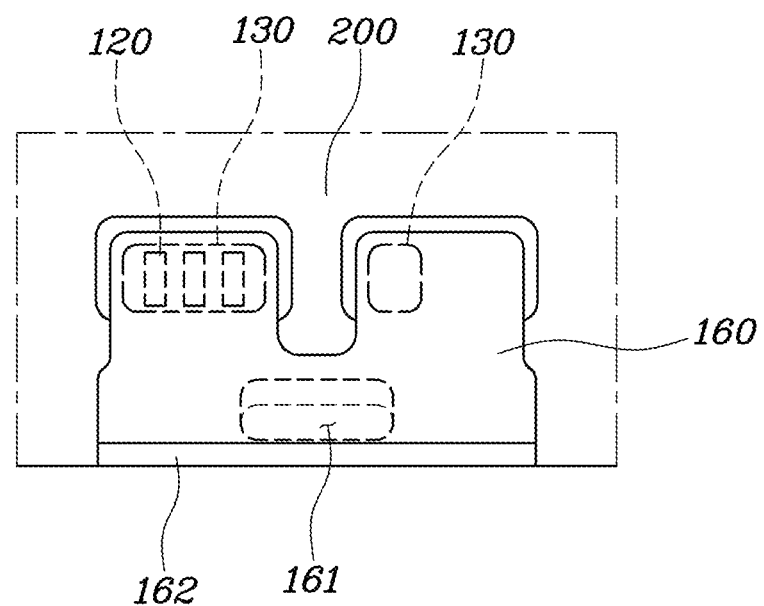
Figure 7:
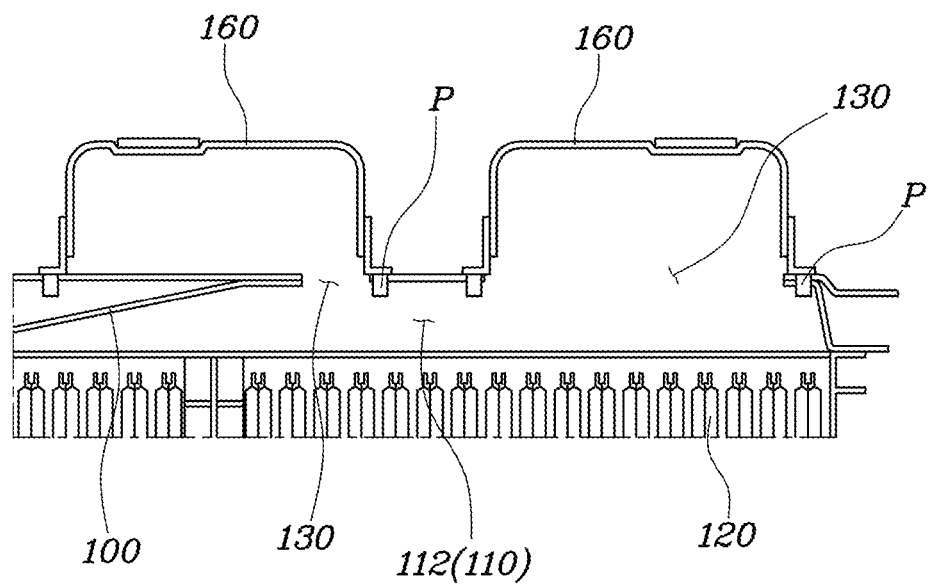

Meanwhile, as shown in FIGS. 5 to 7, the air suction port 130 can be formed in plural, formed to have different areas from each other, and formed to have a larger area in a direction away from the air discharge port 140 provided with the cooling device 150.

Here, a plurality of air suction ports 130 can be formed to be spaced apart from each other in the longitudinal direction of the battery case 100, and two air suction ports 130 are shown in the drawings.

In particular, the plurality of air suction ports 130 have different areas from each other and are formed to gradually have a larger area in a direction away from the air discharge port 140. That is, since the cooling device 150 is connected to the air discharge port 140, the amount of communicating the air is increased as the plurality of air suction ports 130 are closer to the air discharge port 140. Accordingly, the plurality of air suction ports 130 are formed to have a larger area in a direction away from the air discharge port 140 to which the cooling device 150 is connected, such that as the amount of communicating the air is decreased at the air suction port 130 adjacent to the air discharge port 140 and the amount of communicating the air is increased in a direction away from the air discharge port 140, the air introduced through the plurality of air suction ports 130 can efficiently pass through the battery pack 120, thereby securing the cooling efficiency.

Meanwhile, as shown in FIGS. 5 and 7, the battery case 100 can be provided with a suction duct 160 connected to be communicated with the air suction port 130 and extending to the interior to guide the interior air to the internal space 110.

Such a suction duct 160 is connected to be communicated with the air suction port 130, and extends to the interior so that the interior air flows into the internal space 110. Of course, the suction duct 160 can flow exterior air into the internal space 110 of the battery case 100, but it is preferable to communicate the interior air which is less polluted and can maintain a temperature of an appropriate level to the internal space 110.

The suction duct 160 can be coupled to the battery case 100 through a watertightness pad (P) to block foreign matters and moisture from flowing into a site where the suction duct 160 and the battery case 100 have been coupled.

Here, the suction duct 160 can be disposed at the center of the vehicle in the transverse direction on the vehicle floor (F), and a suction port 161 through which the interior air is introduced can be formed to face the front of the vehicle.

In the present disclosure, since the battery case 100 is installed below the back seat, the suction port 161 of the suction duct 160 is preferably formed to face the front of the vehicle in order to smoothly suck the interior air. In addition, the suction duct 160 is disposed at the center of the vehicle in the transverse direction on the vehicle floor (F), thereby avoiding the air inflow obstruction due to the passenger seated on the back seat, and the suction duct 160 is located to avoid a structure configured to install the back seat to the floor (F), thereby not interfering with the seat design.

Meanwhile, the suction port 161 can be provided with a grill part 162 having a plurality of holes by a plurality of ribs crossing vertically and laterally.

As described above, the grill part 162 can be formed of a mesh structure by having the plurality of holes by the plurality of ribs, thereby not disturbing the flow of air introduced through the suction port 161, and blocking the foreign matters flowing into the suction port 161. As a result, the air introduced through the suction duct 160 can be smoothly introduced through the suction port 161, thereby stably maintaining the cooling of the battery pack 120.

Figure 8:
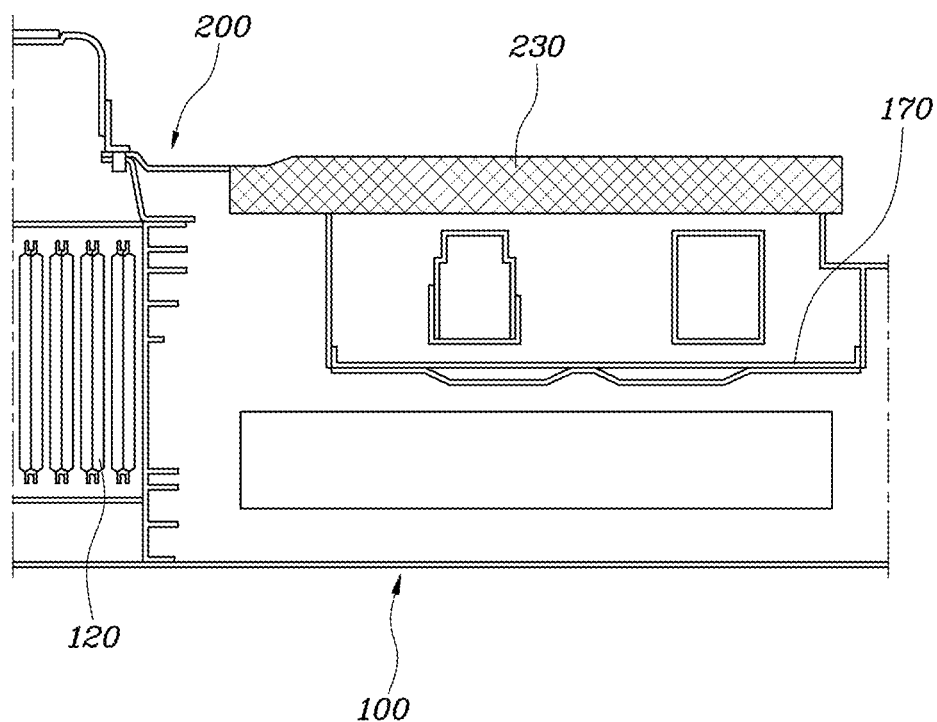

Meanwhile, as shown in FIGS. 2 and 8, the battery case 100 is further provided with an electrical component 170 and the electrical component 170 is disposed to be partitioned from the internal space 110 in which the battery pack 120 is accommodated, and the battery cover 200 can be formed to cover the battery case 100 including the internal space 110 and the electrical component 170 and can be provided with a second noise reduction member 230 for an electrical component formed to surround the electrical component 170 to block the noise generated by the electrical component 170 from flowing into the interior.

Here, the electrical component 170 can be various electric components including a high voltage relay, and prepared at the other side of the battery case 100 opposite to the cooling device 150. Such an electrical component 170 is disposed to be partitioned from the internal space 110 in which the battery pack 120 is accommodated, thereby minimizing the influence of the heat generated from the battery pack 120.

In particular, in the case of the electrical component 170, a noise is generated when the high voltage relay is driven. Accordingly, the battery cover 200 is formed to cover the battery case 100 including the internal space 110 and the electrical component 170, and is provided with the second noise reduction member 230 for the electrical component formed to surround the electrical component 170 to block the noise generated by the electrical component 170 from flowing into the interior. Such a second noise reduction member 230 for the electrical component can be made of a rubber material which is a material capable of absorbing sound.

As described above, when the battery cover 200 is mounted to the battery case 100, the second noise reduction member 230 for the electrical component covers the electrical component 170 to block the noise generated by the electrical component 170 from flowing into the interior, thereby preventing the occurrence of the passenger's discomfort feeling caused by flowing the noise generated by the electrical component 170 into the interior.

Such a second noise reduction member 230 for the electrical component can be formed to be bent to cover the front end of the battery case 100 facing the front of the vehicle from the upper end of the electrical component 170.

As shown in FIG. 4, the second noise reduction member 230 for the electrical component is formed to be bent from the upper end to the front end of the battery case 100, thereby preventing the noise generated by the electrical component 170 from flowing into the interior. That is, as the battery case 100 according to the present disclosure is disposed in the transverse direction of the vehicle and disposed below the back seat, the interior passenger easily recognizes the driving sound of the electrical component 170 when the driving sound generated by the electrical component 170 is delivered to the front of the vehicle. Accordingly, the second noise reduction member 230 for the electrical component is formed to be bent to cover the front end together with the upper end of the battery case 100, thereby efficiently blocking the noise of the electrical component 170 from flowing into the interior. As a result, the second noise reduction member 230 for the electrical component can efficiently block the noise generated by the electrical component 170 from flowing into the interior, and prevent the increase in the manufacturing cost caused by preparing the second noise reduction member 230 for the electrical component in an unnecessary section.

Figure 9:
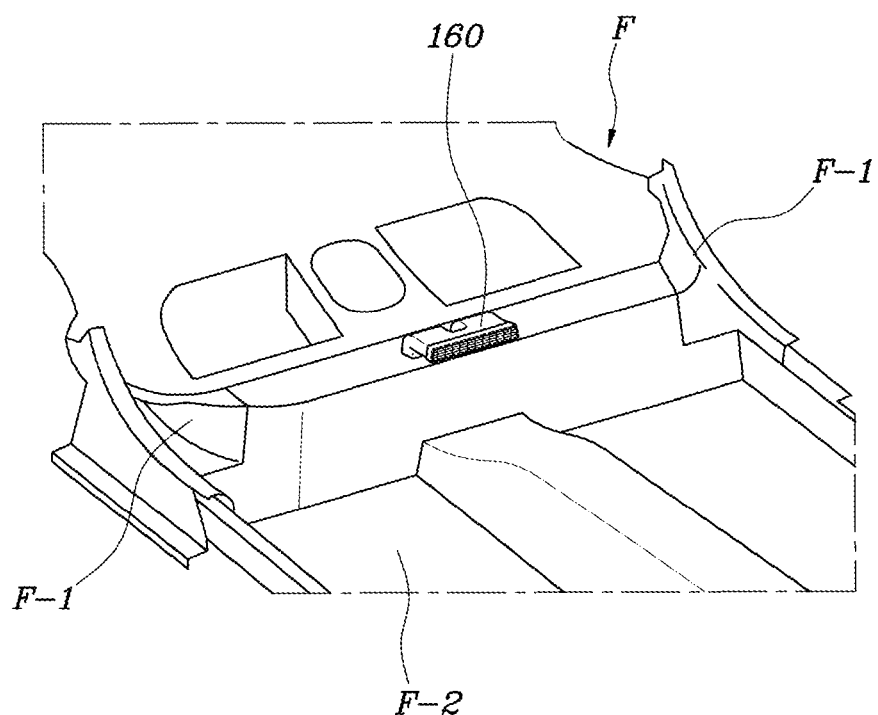

As shown in FIG. 9, in the battery storage device for the electric vehicle according to the present disclosure, only the suction portion 161 of the suction duct 160 is exposed to the interior when a door scuff (F-1) and a carpet (F-2) are mounted to the vehicle body floor (F), and the battery case 100 is prepared below the seat on the top of the floor (F), such that the watertightness structure of the battery case 100 is unnecessary. In addition, the first noise reduction member 220 and the second noise reduction member 230 for the electrical component prepared in the battery cover 200 block the sounds generated by the cooling device 150 and the electrical component 170, respectively, thereby preventing the occurrence of the interior passenger's discomfort feeling caused by generating the noise.

While specific embodiments of the present disclosure have been shown and described, it will be apparent to those skilled in the art that the present disclosure may be variously improved and changed without departing from the technical spirit of the present disclosure provided by the following claims.

What is claimed is:

1. A battery storage device for a vehicle comprising:
   a battery case accommodating a battery pack in an internal space of the battery case, with the battery case including an air suction port through which interior air is sucked and an air discharge port to which the air having cooled the battery pack is discharged, and including a cooling device connected to the air discharge port to circulate the interior air to the internal space; and
   a battery cover covering the battery case, having an inflow hole corresponding to the air suction port when mounted to the battery case, and provided with a first noise reduction rubber disposed between the cooling device and the inflow hole,
   wherein the first noise reduction rubber is bent to cover a front end of the battery case at an upper end of the battery case.

2. The battery storage device for the vehicle according to claim 1,
   wherein the battery case in a transverse direction of the vehicle, the internal space comprising the battery pack extends in the transverse direction of the vehicle.

3. The battery storage device for the vehicle according to claim 1,
   wherein the air discharge port connected to the cooling device is disposed at one side of a bottom of the battery case, and the air suction port is disposed at another side of a top of the battery case to be spaced apart from the air discharge port.

4. The battery storage device for the vehicle according to claim 3,
   wherein the internal space of the battery case has a lower flow path connected to the air discharge port below the battery pack and an upper flow path connected to the air suction port above the battery pack around the battery pack, and the upper flow path is inclined upward from one side to another side facing the air suction port.

5. The battery storage device for the vehicle according to claim 4,
   wherein a gap space is disposed between an upper end of the battery case and the battery cover, and the first noise reduction rubber is interposed in the gap space between the upper end of the battery case and the battery cover.

6. The battery storage device for the vehicle according to claim 1,
wherein the air suction port includes plural portions, the plural portions having areas being different from each other and increasing in a direction away from the air discharge port provided with the cooling device.

7. The battery storage device for the vehicle according to claim 1,
wherein the battery case is installed to a vehicle floor and provided with a suction duct connected to be communicated with the air suction port and extending towards the internal space to guide the interior air to the internal space.

8. The battery storage device for the vehicle according to claim 7,
wherein the suction duct is disposed at a center of the vehicle in a transverse direction on the vehicle floor on which the battery case is disposed.

9. The battery storage device for the vehicle according to claim 8,
wherein the suction port includes a grill part having a plurality of holes by a plurality of ribs crossing vertically and laterally.

10. The battery storage device for the vehicle according to claim 1,
wherein the battery case further includes an electrical component, and the electrical component is disposed to be partitioned from the internal space in which the battery pack is accommodated, and
wherein the battery cover covers the battery case comprising the internal space and the electrical component, and includes a second noise reduction rubber for the electrical component to surround the electrical component to block noise generated by the electrical component from flowing into an interior of the vehicle.

11. The battery storage device for the vehicle according to claim 10,
wherein the second noise reduction rubber for the electrical component is bent to cover a front end of the battery case at an upper end of the electrical component.

12. The battery storage device for the vehicle according to claim 1,
wherein the front end of the battery case and the upper end of the battery case are two different sides of the battery case.

* * * * *